US012770319B2

(12) United States Patent
Black et al.

(10) Patent No.: US 12,770,319 B2
(45) Date of Patent: Oct. 20, 2026

(54) MOVABLE VIRTUAL CAMERA FOR IMPROVED MEETING VIEWS IN 3D VIRTUAL ENVIRONMENT

(71) Applicant: TMRW Group IP, Luxembourg (LU)

(72) Inventors: Robert Harry Black, Wirral Merseyside (GB); Cevat Yerli, Dubai (AE)

(73) Assignee: TMRW GROUP IP, Luxembourg (LU)

( * ) Notice: Subject to any disclaimer, the term of this patent is extended or adjusted under 35 U.S.C. 154(b) by 111 days.

(21) Appl. No.: 18/840,027

(22) PCT Filed: Feb. 20, 2023

(86) PCT No.: PCT/IB2023/051545
§ 371 (c)(1),
(2) Date: Aug. 20, 2024

(87) PCT Pub. No.: WO2023/156984
PCT Pub. Date: Aug. 24, 2023

(65) Prior Publication Data

US 2025/0173952 A1 May 29, 2025

Related U.S. Application Data

(60) Provisional application No. 63/312,250, filed on Feb. 21, 2022.

(51) Int. Cl.
*G06T 15/20* (2011.01)

(52) U.S. Cl.
CPC .................................... *G06T 15/20* (2013.01)

(58) Field of Classification Search
CPC ......... G06T 15/20; H04N 7/157; H04N 7/155
See application file for complete search history.

(56) References Cited

U.S. PATENT DOCUMENTS

| | | | | |
|---|---|---|---|---|
| 2015/0170403 A1* | 6/2015 | Barcay | ................. | G06V 30/422 345/419 |
| 2018/0332422 A1* | 11/2018 | Edry | ................ | H04N 21/23418 |
| 2022/0311971 A1* | 9/2022 | Krol | ........................ | G06F 3/017 |

* cited by examiner

*Primary Examiner* — Michelle Chin
(74) *Attorney, Agent, or Firm* — BRYAN CAVE LEIGHTON PAISNER LLP

(57) ABSTRACT

A computer system implements a 3D virtual environment (312) configured to be accessed by a plurality of client devices each having corresponding a user graphical representation (322) within the 3D virtual environment, which includes positions for the user graphical representations (322) arranged in a geometry (330) and a virtual camera (314) positioned within the 3D virtual environment. The virtual camera (314) moves on a predetermined path (332) that maintains a distance between the virtual camera (314) and the positions (322) arranged in the geometry for the user graphical representations. The computer system captures a video stream from the perspective of the virtual camera on the predetermined path. The video stream includes video of the user graphical representations in the positions arranged in the geometry. The predetermined path maintains a constant viewing orientation angle between the virtual camera and the positions arranged in the geometry, which may include predefined seating positions at a virtual conference table.

20 Claims, 4 Drawing Sheets

MOVABLE VIRTUAL CAMERA FOR IMPROVED MEETING VIEWS IN 3D VIRTUAL ENVIRONMENT

REFERENCE TO RELATED APPLICATIONS

The present application is a National Stage entry pursuant to 35 U.S.C. § of International Application No. PCT/IB2023/051545, filed on Feb. 20, 2023, which claims the benefit of and priority to U.S. Provisional Application No. 63/312,250, filed on Feb. 21, 2022. The disclosures of the prior applications are incorporated by reference in their entirety.

FIELD

The current disclosure relates to 3D virtual environments, and particularly to techniques for improving views in 3D virtual environments.

BACKGROUND

Although an increasing number of videoconferences and other virtual events are taking place worldwide, existing videoconferencing solutions include numerous technological limitations and design flaws that result in unsatisfactory user experiences. For example, many videoconferencing platforms provide a flat, 2D user interface where most interactions take place. In group conferences, these solutions may employ techniques such as a "gallery view," where conference participants appear on the user's screen all at once in a way that makes the other participants appear to be looking directly at the user at all times. Although a user can choose to focus attention on different participants, the user's field of view remains fixed.

Some meeting platforms have attempted to incorporate 3D virtual spaces into video conferences and other virtual events. However, such 3D virtual spaces typically include unnatural or distracting visual phenomena, which contributes to a low level of realism and user satisfaction in such platforms. For example, many 3D virtual spaces provide a first-person perspective to users, in an attempt to mimic the effect of a user being in a physical meeting space. However, from this perspective, users may have constrained views of their neighbors, or the range of motion required to look at other user graphical representations around the room may be undesirable. If a wide-angle view is used, the result may be ugly and distorted. Other undesirable effects may be present in 3D platforms that use 2D graphical representations of other users. For example, the unnatural flatness of such representations may be exacerbated. Size disparity between a nearest neighbor and a user graphical representation further away (e.g., at the opposite side of a conference table) may be dramatic. Paradoxically, the first-person perspective may also flatten 3D representations since there is no parallax in the viewpoint.

Therefore, it is desirable to have a platforms with a more natural and intuitive experience.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a method performed by a computer system comprises implementing a 3D virtual environment configured to be accessed by a plurality of client devices each having corresponding a user graphical representation within the 3D virtual environment, wherein the 3D virtual environment includes positions for the user graphical representations arranged in a geometry and a virtual camera positioned within the 3D virtual environment; moving the virtual camera on a predetermined path that maintains a distance between the virtual camera and the positions arranged in the geometry for the user graphical representations; and capturing a video stream from the perspective of the virtual camera on the predetermined path, wherein the video stream includes video of the user graphical representations in the positions arranged in the geometry.

In some embodiments, the location or orientation of the movable virtual camera is configured to be controlled by at least one of the client devices.

In some embodiments, the geometry comprises a circle, an oval, a polygon, a linear geometry, an arcuate geometry, or a curvilinear geometry. Different predetermined paths may be used with different geometries. For example, in an embodiment, the geometry is a circle, and the predetermined path is a circular path within the circle. In another embodiment, the geometry is a circle and the predetermined path is a fixed point within the circle. In such an embodiment, the moving of the movable virtual camera on the predetermined path may include rotating the virtual camera about an axis corresponding to the fixed point.

In some embodiments, more than one virtual camera is used. In an embodiment, the at least one virtual environment comprises one or more additional movable virtual cameras configured to be moved on the predetermined path or on different paths.

In some embodiments, the predetermined path maintains a constant viewing orientation angle between the virtual camera and the positions arranged in the geometry for the user graphical representations.

In some embodiments, the positions arranged in the geometry comprise defined seating positions for the user graphical representations at a virtual conference, such as predefined seating positions at a virtual conference table.

In another aspect, a computer readable medium (e.g., a non-transitory computer readable medium) has stored thereon instructions configured to cause at least one computer comprising a processor and memory to perform any of the methods described herein. In another aspect, a computer system comprising one or more computers having at least one processor and memory is programmed to perform any of the methods described herein.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
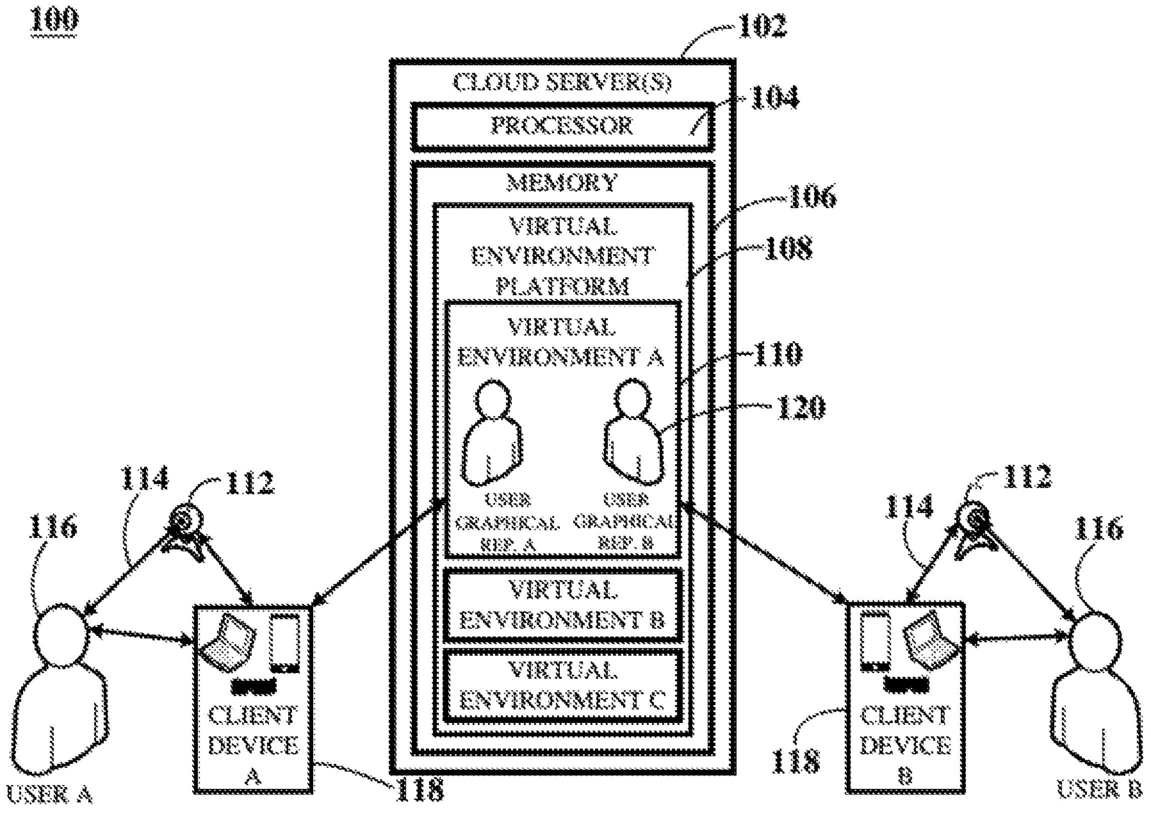
FIG. 1 depicts a schematic representation of a system enabling interactions, including social interactions, in virtual environments, according to an embodiment.

In the following description, reference is made to drawings which show by way of illustration various embodiments. Also, various embodiments will be described below by referring to several examples. It is to be understood that the embodiments may include changes in design and structure without departing from the scope of the claimed subject matter.

Systems and methods of the current disclosure provide improved camera views in a virtual environment platform comprising one or more virtual environments enabling real-time multi-user collaborations and interactions similar to those available in real life, which may be used for meetings, working, education, or other contexts. The virtual environment may be a 3D virtual environment comprising an arrangement and visual appearance, which may be customized by the users depending on their preferences or needs.

In described embodiments, a computer system implements a 3D virtual environment configured to be accessed by a plurality of client devices each having corresponding a user graphical representation within the 3D virtual environment. The 3D virtual environment includes positions for the user graphical representations arranged in a geometry and a virtual camera positioned within the 3D virtual environment. The virtual camera moves on a predetermined path that maintains a distance between the virtual camera and the positions arranged in the geometry for the user graphical representations. The computer system captures a video stream from the perspective of the virtual camera on the predetermined path. The video stream includes video of the user graphical representations in the positions arranged in the geometry.

The users may access the virtual environment through a graphical representation that may be inserted into the virtual environment and graphically combined with the 3D virtual environment. The user graphical representation may be a user 3D virtual cutout constructed from a user-uploaded or third-party-source photo with a removed background, or a user real-time 3D virtual cutout, or a video with removed background, or video without removed background. In some embodiments, the type of user graphical representation may be switched from one type to another, as desired by the user. The user graphical representations may be supplemented with additional features such as user status providing further details about the current availability or other data relevant to other users. In some embodiments, interactions such as conversation and collaboration between users in the virtual environments along with interactions with objects within the virtual environment are enabled.

Enabling virtual presence and realistic interactions and collaborations between users in such virtual environments may increase realism of remote activity. The systems and methods of the current disclosure further enable the access of the various virtual environments on client devices such as mobile devices or computers, without the need of more costly immersive devices such as extended reality head-mounted displays or costly novel system infrastructures. Client or peer devices of the current disclosure may comprise, for example, computers, headsets, mobile phones, glasses, transparent screens, tablets and generally input devices with cameras built-in or which may connect to cameras and receive data feed from said cameras.

FIG. 1 depicts a schematic representation of a system 100 enabling social interactions in virtual environments, in which described embodiments may be implemented. In the example shown in FIG. 1, system 100 of the current disclosure enabling interactions in virtual environments comprises one or more cloud server computers 102 comprising at least one processor 104 and memory 106 storing data and instructions implementing a virtual environment platform 108 comprising at least one virtual environment 110, such as virtual environments A-C. The one or more cloud server computers are configured to insert a user graphical representation generated from a live data feed obtained by a camera at a three-dimensional coordinate position of the at least one virtual environment, update the user graphical representation in the at least one virtual environment, and enable real-time multi-user collaboration and interactions in the virtual environment. In described embodiments, inserting a user graphical representation into a virtual environment involves graphically combining the user graphical representation in the virtual environment such that the user graphical representation appears in the virtual environment (e.g., at a specified 3D coordinate position). In the example shown in FIG. 1, the system 100 further comprises at least one camera 112 obtaining live data feed 114 from a user 116 of a client device 118. The one or more client devices 118 communicatively connect to the one or more cloud server computers 102 and at least one camera 112 via a network. A user graphical representation 120 generated from the live data feed 114 is inserted into a three-dimensional coordinate position of the virtual environment 110 (e.g., virtual environment A) and is graphically combined with the virtual environment as well as updated using the live data feed 114. The updated virtual environment is served to the client device by direct P2P communication or indirectly through the use of one or more cloud servers 102. The system 100 enables real-time multi-user collaboration and interactions in the virtual environment 110 by accessing a graphical user interface through the client device 118.

In FIG. 1, two users 116 (e.g., users A and B, respectively) are accessing virtual environment A and are interacting with elements therein and with each other through their corresponding user graphical representations 120 (e.g., user graphical representations A and B, respectively) accessed through corresponding client devices 118 (client devices A and B, respectively). Although only two users 116, client devices 118 and user graphical representations 120 are depicted in FIG. 1, the system may enable more than two users 116 interacting with each other through their corresponding graphical representations 120 via corresponding client devices 118, as described in greater detail below.

In some embodiments, the client devices 118 may be one or more of mobile devices, personal computers, game consoles, media centers, and head-mounted displays, amongst others. The cameras 110 may be one or more of a 2D or 3D camera, 360 degree camera, web-camera, RGBD camera, CCTV camera, professional camera, mobile phone camera, depth camera (e.g., LIDAR), or a light-field camera, amongst others.

In some embodiments, a virtual environment 110 refers to a virtual construct (e.g., a virtual model) designed through any suitable 3D modelling technique through computer assisted drawing (CAD) methods. In further embodiments, the virtual environment 110 refers to a virtual construct that is scanned from a real construct (e.g., a physical room) through any suitable scanning tools, comprising image-scanning pipelines input through a variety of photo, video, depth measurements, and/or simultaneous location and mapping (SLAM) scanning in order to generate the virtual environment 110. For example, radar-imaging, such as synthetic-aperture radars, real-aperture radars, Light Detection and Ranging (LIDAR), inverse aperture radars, monopulse radars, and other types of imaging techniques may be used to map and model real-world constructs and turn them into a virtual environment 110. In other embodiments, the virtual environment 110 is a virtual construct that is modelled after a real construct (e.g., a room, building or facility in the real world).

In some embodiments, the client devices 118 and at least one cloud server computer 102 connect through a wired or wireless network. In some embodiments, the network may include millimeter-wave (mmW) or combinations of mmW and sub 6 GHz communication systems, such as $5^{th}$ generation wireless systems communication (5G). In other embodiments, the system may connect through wireless local area networking (Wi-Fi). In other embodiments, the system may communicatively connect through fourth generation wireless systems communication (4G), may be supported by 4G communication systems, or may include other wired or wireless communication systems.

In some embodiments, processing and rendering comprised in the generation, updating and insertion of the user graphical representation 120 into the selected virtual environment 110 and combination therewith is performed by at least one processor of the client device 118 upon receiving the live data feed 114 of the user 116. The one or more cloud server computers 102 may receive the client-rendered user graphical representation 120, insert the client-rendered user graphical representation 120 into a three-dimensional coordinate of the virtual environment 110, combine the inserted user graphical representation 120 with the virtual environment 110 and then proceed to transmit the client-rendered user graphical representation 120 to receiving client devices. For example, as viewed in FIG. 1, client device A may receive the live data feed 114 from the respective camera 112, may process and render the data from the live data feed 114, generating the user graphical representation A, and may then transmit the client-rendered user graphical representation A to the at least one cloud server computer 102, which may position the user graphical representation A in a three-dimensional coordinate of the virtual environment 118 before transmitting the user graphical representation A to client device B. A similar process applies to the client device B and the user graphical representation B from user B. Both user graphical representations A and B may thus view each other in the virtual environment A and interact.

In some embodiments, processing and rendering comprised in the generation, updating and insertion of the user graphical representation 120 and combination with the virtual environment is performed by the at least one processor 104 of the one or more cloud server computers 102 upon the client device 118 sending the unprocessed live data feed 114 of the user 116. The one or more cloud server computers 102 thus receive the unprocessed live data feed 114 of the user 116 from the client device 118 and then generate, process and render from the unprocessed live data feed, a user graphical representation 120 that is positioned within a three-dimensional coordinate of the virtual environment 110 before transmitting the cloud-rendered user graphical representation within the virtual environment to other client devices 118. For example, as viewed in FIG. 1, client device A may receive the live data feed 114 from the respective camera 112 and may then transmit the unprocessed user live data feed 114 to the at least one cloud server computer 102, which may generate, process and render the user graphical representation A and position the user graphical representation A in a three-dimensional coordinate of the virtual environment 118 before transmitting the user graphical representation A to client device B. A similar process applies to the client device B and the user graphical representation B from user B. Both user graphical representations A and B may thus view each other in the virtual environment A and interact.

In some embodiments, the user graphical representation is a user 3D virtual cutout constructed from a user-uploaded or third-party-source (e.g., from a social media website) photo, or a user real-time 3D virtual cutout comprising the real-time video stream of the user 116 with a removed background, or a video with removed background, or a video without removed background. In further embodiments, the client device 118 generates the user graphical representation 120 by processing and analyzing the live camera feed 114 of the user 116, generating animation data that is sent to other peer client devices 118 via a peer-to-peer (P2P) system architecture or a hybrid system architecture. The receiving peer client devices 118 use the animation data to locally construct and update the user graphical representation.

A user 3D virtual cutout may include a virtual replica of a user constructed from a user-uploaded or third-party-source 2D photo. In an embodiment, the user 3D virtual cutout is created via a 3D virtual reconstruction process through machine vision techniques using the user-uploaded or third-party-source 2D photo as input data, generating a 3D mesh or 3D point cloud of the user with removed background. In one embodiment, the user 3D virtual cutout may have static facial expressions. In another embodiment, the user 3D virtual cutout may comprise facial expressions updated through the camera feed. In yet another embodiment, the user 3D virtual cutout may comprise expressions that may be changed through buttons on the user graphical interface, such as buttons that permit the user 3D virtual cutout to smile, frown, be serious, and the like. In yet a further embodiment, the user 3D virtual cutout uses combinations of aforementioned techniques to display facial expressions. After generating the user 3D virtual cutout, the status and/or facial expressions of the user 3D virtual cutout may be continuously updated by, e.g., processing the camera feed from the user. However, if the camera is not turned on, the user 3D virtual cutout may still be visible to other users with an unavailable status and static facial expressions. For example, the user may be currently focused on a task and may not want to be disturbed (e.g., having a "do not disturb" or "busy" status), therefore having his or her camera off. 3D face model reconstruction (e.g., 3D face fitting and texture fusion) techniques for the creation of the user 3D virtual cutout may be used so that the resulting user graphical representation is clearly recognizable as being the user.

A user real-time 3D virtual cutout may include a virtual replica of a user based on the real-time 2D or 3D live video stream data feed obtained from the camera and after having the user background removed. In an embodiment, the user real-time 3D virtual cutout is created via a 3D virtual reconstruction process through machine vision techniques using the user live data feed as input data by generating a 3D mesh or 3D point cloud of the user with removed background. For example, the user real-time 3D virtual cutout may be generated from 2D video from a camera (e.g., a webcam) that may be processed to create a holographic 3D mesh or 3D point cloud. In another example, the user real-time 3D virtual cutout may be generated from 3D video from depth cameras (e.g., LIDARs or any depth camera) that may be processed to create a holographic 3D mesh or 3D point cloud. Thus, the user real-time 3D virtual cutout represents the user graphically in three dimensions and in real time.

A video with removed background may include a video streamed to a client device, wherein a background removal process has been performed so that only the user may be visible and then displayed utilizing a polygonal structure on the receiving client device. Video without removed background may include a video streamed to a client device, wherein the video is faithfully representing the camera capture, so that the user and his or her background are visible and then displayed utilizing a polygonal structure on the receiving client device. The polygonal structure can be a quad structure or more complex 3D structures used as a virtual frame to support the video.

A video without removed background may include a video streamed to a client device, wherein the video is faithfully representing the camera capture, so that the user and his or her background are visible and then displayed utilizing a polygonal structure on the receiving client device. The polygonal structure can be a quad structure or more complex 3D structures used as a virtual frame to support the video.

In some embodiments, the data used as input data comprised in the live data feed and/or user-uploaded or third-party-source 2D photo comprises 2D or 3D image data, 3D geometries, video data, media data, audio data, textual data, haptic data, time data, 3D entities, 3D dynamic objects, textual data, time data, metadata, priority data, security data, positional data, lighting data, depth data, and infrared data, amongst others.

In some embodiments, the background removal process required to enable the user real-time 3D virtual cutout is performed through image segmentation and usage of deep neural networks, which may be enabled through implementation of instructions by the one or more processors of the client device 118 or the at least one cloud server computer 102. Image segmentation is a process of partitioning a digital image into multiple objects, which may help to locate objects and boundaries that can separate the foreground (e.g., the user real-time 3D virtual cutout) obtained from the live data feed 114 of the user 116 from the background. A sample image segmentation that may be used in embodiments of the current disclosure may comprise the Watershed transformation algorithm available, for example, from OpenCV.

A suitable process of image segmentation that may be used for background removal in the current disclosure uses artificial intelligence (AI) techniques such as computer vision to enable such a background removal, and may comprise instance segmentation and/or semantic segmentation. Instance segmentation gives each individual instance of one or more multiple object classes a distinct label. In some examples, instance segmentation is performed through Mask R-CNN, which detects objects in an image, such as from the user live data feed 114 while simultaneously generating a high-quality segmentation mask for each instance, in addition to adding a branch for predicting an object mask in parallel with the existing branch for bounding box recognition. The segmented masks created for the user and for the background are then extracted and the background may be removed. Semantic segmentation uses deep learning or deep neural networks (DNN) techniques, enabling an automated background removal process. Semantic segmentation partitions images into semantically meaningful parts by giving each pixel a class label from one or more categories, such as by color, texture and smoothness, depending on predefined rules. In some examples, semantic segmentation may utilize fully convolutional networks (FCN) trained end-to-end, pixels-to-pixels on semantic segmentation, as disclosed in the document "Fully Convolutional Networks for Semantic Segmentation," by Evan Shelhamer, Jonathan Long, and Trevor Darrell, in *IEEE Transactions on Pattern Analysis and Machine Intelligence*, Vol. 39, No. 4 (April 2017), which is incorporated herein by reference. After the aforementioned background removal process, a point cloud within the face and body boundary of the user may remain, which the one or more processors of the client device 118 or the at least one cloud server computer 102 may process to generate a 3D mesh or 3D point cloud of the user that may be used in the construction of the user real-time 3D virtual cutout. The user real-time 3D virtual cutout is then updated from the live data feed 114 from camera 112.

Figure 2:
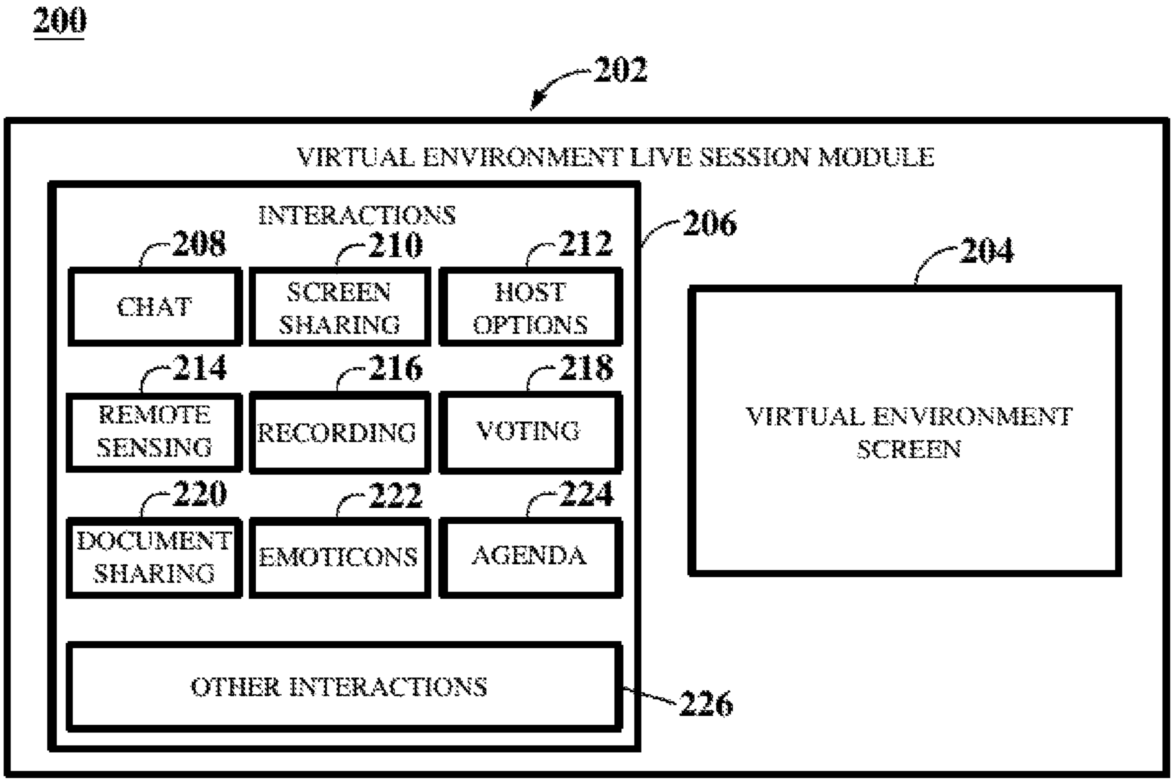
FIG. 2 depicts a schematic representation of a graphical user interface whereby users may interact in the virtual environment, according to an embodiment.

FIG. 2 depicts a schematic representation of a virtual environment live session module 202 whereby users may interact in the virtual environment, according to an embodiment.

Before a user may have access to the graphical user interface of the virtual environment live session module 202, the user may first receive an invitation from a peer client device to engage in a conversation with a peer user, which may open up a P2P communication channel between the user client devices when the processing and rendering is performed by the client device, or may alternatively open up an indirect communication channel through the cloud server computer when processing and rendering is performed by the at least one cloud server computer. Furthermore, a transition from a user 3D virtual cutout to a user real-time 3D virtual cutout, or video with removed background, or video without removed background may take place.

The virtual environment live session module 202 may comprise a virtual environment screen 204 including a graphical user interface showing the selected virtual environment, which may include an arrangement of the virtual environment associated with the context of a selected vertical of the virtual environment, and corresponding virtual objects, applications, other user graphical representations, and the like. The graphical user interface of the virtual environment live session module 202 may enable and display a plurality of interactions 206 configured for users to engage with each other, e.g., through their user real-time 3D virtual cutouts. The virtual environment live session module 202 may comprise one or more data models associated with the corresponding tasks enabling each interaction 206, plus the computer instructions required to implement said tasks. Each interaction 206 may be represented in different ways; in the example shown in FIG. 2, individual interactions 206 are each represented as a button on the graphical user interface from the virtual environment live session module 202, wherein clicking on each interaction button may request corresponding services to perform a task associated to the interaction 206. The virtual environment live session module 202 may, for example, be enabled through the hybrid system architecture 300 disclosed with reference to FIG. 3.

The interactions 206 may comprise, for example, chatting 208, screen sharing 210, host options 212, remote sensing 214, recording 216, voting 218, document sharing 220, emoticon sending 222, agenda sharing and editing 224, or other interactions 226. The other interactions 226 may comprise, for example virtually hugging, hand-raising, hand-shaking, walking, content adding, meeting-summary preparation, object moving, projecting, laser-pointing, game-playing, purchasing and other social interactions facilitating exchange, competition, cooperation, resolution of conflict between users. The various interactions 206 are described in more detail below.

Chatting 208 may open up a chat window enabling sending and receiving textual comments and on-the-fly resources.

Screen sharing 210 may enable to share in real-time the screen of a user to any other participants.

Host options 212 are configured to provide further options to a conversation host, such as muting one or more users, inviting or removing one or more users, ending the conversation, and the like.

Remote sensing 214 enables viewing the current status of a user, such as being away, busy, available, offline, in a conference call, or in a meeting. The user status may be updated manually through the graphical user interface or automatically through machine vision algorithms based on data obtained from the camera feed.

Recording 216 enables recording audio and/or video from the conversation.

Voting 218 enables to provide a vote for one or more proposals posted by any other participant.

Document sharing 220 enables to share documents in any suitable format with other participants. These documents may also be persisted permanently by storing them in persistent memory of the one or more cloud server computers and may be associated with the virtual environment where the virtual communication takes place.

Emoticon sending 222 enables sending emoticons to other participants.

Agenda sharing and editing 224 enables sharing and editing an agenda that may have been prepared by any of the participants.

The other interactions 226 provide a non-exhaustive list of possible interactions that may be provided in the virtual environment depending on the virtual environment vertical. Hand-raising enables raising the hand during a virtual communication or meeting so that the host or other participants with such an entitlement may enable the user to speak. Walking enables moving around the virtual environment through the user real-time 3D virtual cutout. Content adding enables users to add interactive applications or static or interactive 3D assets, animations or 2D textures to the virtual environment. Meeting-summary preparation enables an automatic preparation of outcomes of a virtual meeting and distributing such outcomes to participants at the end of the session. Object moving enables moving objects around within the virtual environment. Projecting enables projecting content to a screen or wall available in the virtual environment from an attendee's screen. Laser-pointing enables pointing a laser in order to highlight desired content on a presentation. Game-playing enables playing one or more games or other types of applications that may be shared during a live session. Purchasing enables making in-session purchases of content. Other interactions not herein mentioned may also be configured depending on the specific use of the virtual environment platform.

Any of the aforementioned interactions of 206 or other interactions 226 may be performed also directly within the virtual environment screen 204.

Camera Views

In embodiments described herein, various camera or perspective views may be used depending on context or user preferences, such as a top viewing perspective, or a third-person viewing perspective, or a first-person viewing perspective, or a self-viewing perspective that includes the user graphical representation as it may be seen by another user graphical representation. In some embodiments, a viewing perspective is updated as a user 116 manually navigates through the virtual environment 110 via the graphical user interface. In some embodiments, the viewing perspective is established and updated automatically, such as by tracking and analyzing user eye-and-head-tilting data, or head-rotation data, or a combination thereof. In some embodiments, the viewing perspective of the user 116 captured by the camera 112 is associated to the viewing perspective of the user graphical representation 120 and the associated virtual camera(s) using computer vision, accordingly adjusting the viewing perspective.

In some scenarios, such as virtual meeting rooms, a first-person perspective is ineffective. In such scenarios, users may have constrained views of their neighbors, or the range of motion required to look at other user graphical representations around the room may be undesirable. If a wide-angle view is used in an attempt to replicate the human eye's field of view, the result may be ugly and distorted. If 2D user graphical representations are used, their unnatural flatness may be exacerbated. Size disparity between a nearest neighbor and a user graphical representation further away (e.g., at the opposite side of a large table) may become very dramatic. Paradoxically, the first-person perspective may also flatten 3D representations since there is no parallax in the viewpoint.

Accordingly, in some embodiments, a third-person perspective is provided by a movable virtual camera. The virtual camera provides a virtual representation of the viewing perspective of the user 116, enabling the user 116 to view in one of many viewing perspectives the area of the virtual environment 110. In some embodiments, the virtual camera location or orientation within the virtual environment can be adjusted based on user input, such as mouse input, keyboard input, controller input, touchscreen input, eye-and-head-tilting data, or head-rotation data, or a combination thereof.

In embodiments described herein, the virtual environment employs cinematic techniques such as a shallow depth of field or a rotary or other fixed camera track to create an improved perspective of a 3D scene. Traditional first-person perspective involves the principle of direct embodiment (e.g., the camera perspective matches the assumed eye position of user within the environment). Described embodiments provide a third person perspective, whereby the viewer is not directly embodied the viewer's graphical representation. In some embodiments, one or more movable virtual cameras move on one or more predetermined paths that maintain a constant distance between the movable virtual camera and the geometry in which user graphical representations within the virtual environment may be arranged, such as a circular geometry representing possible seating positions around a virtual conference table.

In further embodiments, the one or more predetermined paths maintain a constant viewing orientation angle, which can help to keep the verticals (or vertical orientation) of the camera relative to the subject correct and stable, and to clean and improve the appearance along with reducing visual noise, increasing the stability of the user experience in the virtual environment. In such embodiments, the virtual camera does not move up or down as it moves along the path, which may otherwise distort the view, or cause confusion or even dizziness on the part of the user.

In some embodiments, if both the distance and viewing orientation angle remain constant, the virtual camera then only moves along the camera path horizontally following the predetermined angle of the path, if any, without having the camera view move up and down or rotating left or right. The direction of travel of the virtual camera along the path may be in a straight line, as may be used to follow a straight row of virtual seating in a conference room, or in a different path of curves, shapes, or angled lines, as described in further detail below.

In some embodiments, the viewer is provided with the perspective of a virtual camera rig replicating a physical circular or other fixed camera track from cinematography. In such a perspective, the viewer may see graphical representations of other users as well as their own, contextualized in the 3D virtual environment.

Figure 3:
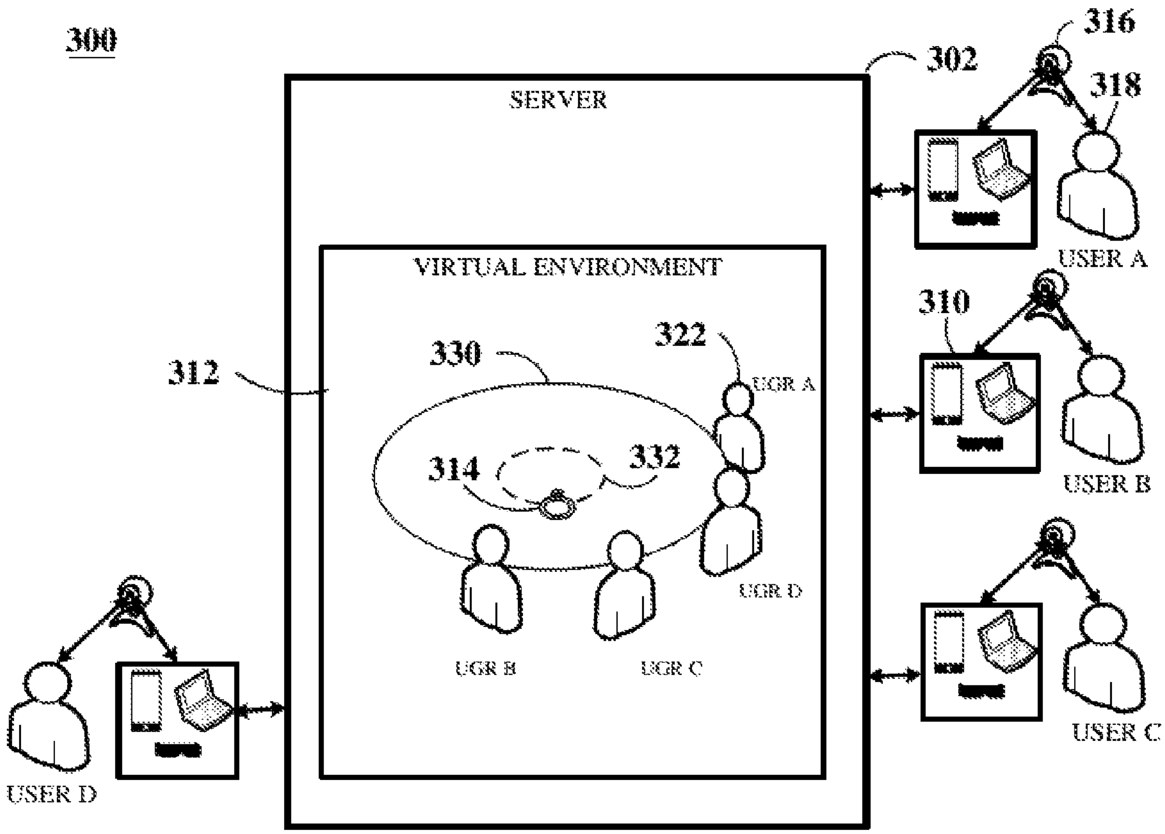
FIG. 3 depicts schematic representation of a system implementing a movable virtual camera for improved views in a 3D virtual environment.

FIG. 3 depicts a schematic representation of a system 300 implementing a movable virtual camera for improved views in a 3D virtual environment.

The system 300 may include one or more server computers. The illustrative system 300 shown in FIG. 3 comprises at least one server computer 302 comprising at least one processor and memory, implementing a virtual environment 312. The virtual environment 312 includes a movable virtual camera 314 positioned within the virtual environment 312 and configured to capture video streams from within the virtual environment 312. The virtual environment 312 may be hosted by at least one dedicated server computer connected via a network to the at least one server computer 302, or may be hosted in a peer-to-peer infrastructure and relayed through the at least one server computer 302. In some embodiments, the video stream is sent to the at least one server computer 302 for broadcasting to one or more client devices 310. The system 300 further comprises cameras 316 obtaining live camera feeds from users 318 of the client devices 310 and sending the live camera feed data to the at least one server computer 302 via the client devices 310. The movable virtual camera 314 sends the video streams to the at least one server computer 302.

In the example shown in FIG. 3, the movable virtual camera 314 moves on a predetermined path 332 that maintains a constant distance and, in additional embodiments, also a constant viewing orientation angle between the movable virtual camera and the geometry in which objects are arranged, such as user graphical representations 322 (or UGRs, as denoted in FIG. 3) in seating positions around a virtual conference table 330. As the virtual camera 314 moves on the predetermined path 332, or the point of view of the virtual camera is otherwise adjusted (such as by tilting or rotating the camera to change the viewing angle), the perspective is updated in the virtual environment 312.

In some embodiments, the movable virtual camera 314 is managed through a client device 310 accessing the virtual environment, which may be configured to move the movable virtual camera 314 responsive to user input along the predetermined path 332 or otherwise adjust the point of view of the virtual camera (such as by tilting or rotating the camera to change the viewing angle), which is then updated in the virtual environment.

In the example illustrated in FIG. 3, users A-D access the virtual environment 312 through their corresponding client devices 310, wherein each user A-D has at least one camera 316 capturing, e.g., video data and/or image data, with the cameras or corresponding client devices 310 sending multimedia streams corresponding to each user A-D, which may be used in the generation of the user graphical representations A-D within the virtual environment 312. Thus, in the virtual environment 312, each user A-D has a corresponding user graphical representation A-D.

In an illustrative scenario, the user corresponding to user graphical representation A may wish to view user graphical representations B and C in a virtual meeting, but the first-person view is not effective. User graphical representation D is in A's first-person field of view and may occlude B or C or otherwise interfere with A's desired view of B and C, such as by appearing too large relative to B and C. In order to provide a better view without requiring the user graphical representation A to be moved, the virtual camera 314 is moved to the location on the predetermined path 332 indicated in FIG. 3, in which the field of view of the virtual camera 314 points outwards from the path 332 towards the seating positions and captures user graphical representations B and C in a third-person view while avoiding interference from user graphical representation D. The predetermined path 332 maintains a distance between the movable virtual camera 314 and the geometry of the seating positions around the virtual conference table 330. Thus, at a different position on the predetermined path 332, the movable virtual camera is also able to provide desirable third-person views of user graphical representations A and D or any other object or user graphical representation positioned around the virtual conference table 330, from the same distance. Alternatively, the virtual camera 314 could be positioned elsewhere, such as at the opposite side of the circular path 332 with the field of view pointing across the diameter of circular path 332 towards the user graphical representations positioned around the virtual conference table 330, which allows the virtual camera 314 to maintain a larger but still constant distance from the geometry on which the seating positions are arranged, as the virtual camera 314 moves around the path 332.

Although the geometry in this example, as represented by the virtual conference table 330, is a circle with a corresponding circular predetermined path 332 within the circle, other geometries are possible, including an oval, a polygon, a linear geometry, an arcuate geometry, or a curvilinear geometry. In illustrative virtual meeting scenarios, such geometries may be used in meetings having seating positions around rectangular or curved virtual conference tables, on one side of a table, in linear or curved rows, or any number of other geometries. Furthermore, in the case where the geometry is circular, the predetermined path 332 on which the virtual camera 314 moves may also be a fixed point within the circular geometry. In that case, the moving of the virtual camera 314 on the predetermined path includes rotating the virtual camera 314 about an axis corresponding to the fixed point, such that the field of view of the virtual camera follows the circular geometry of the seating positions without the virtual camera moving from the fixed point. This may be a desirable option for, e.g., small virtual conference tables where the center of the table is suitably near to the seating positions around the table to provide a good view of user graphical representations in those seating positions.

In some embodiments, the virtual distance between the camera track and user graphical representations arranged in a geometry of seating positions is substantially maintained, but with some variance. This variance may be based on, e.g., the shape of a virtual conference table around which the participants are seated. Whereas with a circular conference table it is easier to maintain the same distance with a corresponding circular camera path, for a different geometry, such as an oval conference table, there can be more variance between the camera path and the seating positions. For example, for an oval conference table where the oval shape is flatter, with relatively narrow tips, a camera path that matches that shape of the table may produce unusual effects as the camera moves out to the tips of the oval. In this situation, the camera path may be designed as a more rounded oval shape in which, although the distance between the camera path and the table edge will vary, the design will still maintain a more constant visual geometry between the virtual camera and the participants compared with a first-person view.

The path of the camera tends to follow the contour of the table, and as such maintains a more consistent visual angle than being seated in a fixed position. In a fixed position, for an eight person round conference table, the distance between the viewer and another participant may vary from ⅛th of the circumference for a nearest neighbor (2πR/8) to 2R for someone opposite (e.g., the diameter of the table). Whereas with a camera path that matches the circular shape, the distance between the camera and adjacent participants is:

$$\sqrt{(1.5 * R)^2 + ((2\pi R/8)/2)^2}\text{"}$$

As the camera moves along the path, the movement may be smooth or continuous, or the camera may move between discrete points on the path, such as points on the path opposite known seating positions at a virtual conference table. Continuous, smooth, and discrete-point movement may also be combined. For example, the camera may move smoothly and continuously from one discrete point (e.g., focused on a first defined seating position at a conference table) and come to rest gradually at another discrete point (e.g., focused on a second defined seating position at the conference table), which allows for smooth camera motion as well as precise positioning, without requiring the user to manually stop the camera from moving at the desired location. These discrete points may be predefined (e.g., at the location of a chair that remains in a fixed position at the table), or they may be flexibly or dynamically defined based on, e.g., the position of user graphical representation at the table independent of any predefined position. Thus, the defined seating positions may change based on factors such as movements of the user graphical representations, and the discrete points for a camera to be positioned may be updated based on those factors. The virtual camera may zoom in and out to widen or narrow the field of view, e.g., to focus on a particular object or user graphical representation or to bring more objects, user graphical representations, or background content into view. In some embodiments, the viewing angle of the camera may be rotated or otherwise adjusted. In some embodiments, a particular target such as an object or a particular user graphical representation may be selected, and the camera angle may be rotated as the position of the camera moves to lock on to that target and maintain that target within the field of view. However, it is preferable in some situations, as described elsewhere herein, to keep the angle of the camera fixed as it moves along the camera path to maintain a stable viewing environment and reduce the amount of perceived motion in the camera view. Such options may be set or adjusted based on user preference or design considerations.

The virtual environment 312 may include one or more additional movable virtual cameras (not shown), which may also be configured to be moved on the predetermined path or on different paths. Thus, one or more of the users A-D may have one or more virtual cameras associated with them, on the same path or on different paths, to provide many different options for third-person views or combinations of third person views in the virtual environment 312. In one example of a multiple-virtual-camera arrangement, a virtual camera is provided for each linear or curvilinear row in an auditorium seating arrangement, with a predetermined path for each row. In another example, a virtual camera is provided for each of several tables in a conference room, with a predetermined path for each table.

Described embodiments include one or more technical advantages over prior techniques, such as making spaces modeled in the virtual environment 312 look deeper. In an embodiment, the field of view of a movable virtual camera is approximately ⅓th of the first person equivalent, with 20 degrees horizontal field of view instead of 60 degrees. This foreshortens the background, expanding the visual interest of the context, and reducing visually off-putting "tunnel" effects, where the linear perspective is so strong that users have difficulty correlating the experience with a realistic work or meeting environment. In an embodiment, the apparent flatness of 2D cutouts is also reduced. Since there is less contextual depth in the scene, combined with the stronger parallax cue (which is itself exaggerated due to the narrower viewing angle) the user's brain perceives the cutouts as more veridical in depth. Due to the camera maintaining a consistent distance from and angle between the cutouts, they appear to be of a similar size, while still being contextualized in a 3D space to avoid the unrealistic experience associated with flat, gallery-style video conference applications. Further, in described embodiments, the horizontal movement on the camera track is predictable. This allows for non-expert users to scroll or move the camera along the path in a way that is simultaneously visually interesting but also constrained, controlled and regular.

In some embodiments, the virtual environment 312 hosts a live virtual event including one or more of a panel discussion, speech, conference, presentation, webinar, entertainment show, sports event, and performance, wherein a plurality of user graphical representations of real speakers speaking remotely (e.g., from their home while being recorded to their corresponding camera 316) is placed within the virtual environment 312.

In some embodiments, multimedia streams are viewed either as a real-time 3D view in a web browser that is client-or-cloud computer rendered, or may be streamed to be watched live in suitable video platforms. In some examples, multimedia streams are viewed either as a real-time 3D view in a web browser that is client-or-cloud computer rendered. The users may watch the multimedia streams of an event (e.g., a webinar, conference, panel, speech, etc.) as a real-time 3D view in a web browser that is client-or-cloud computer rendered, or may be streamed to be watched live in suitable video platforms and/or social media.

Figure 4:
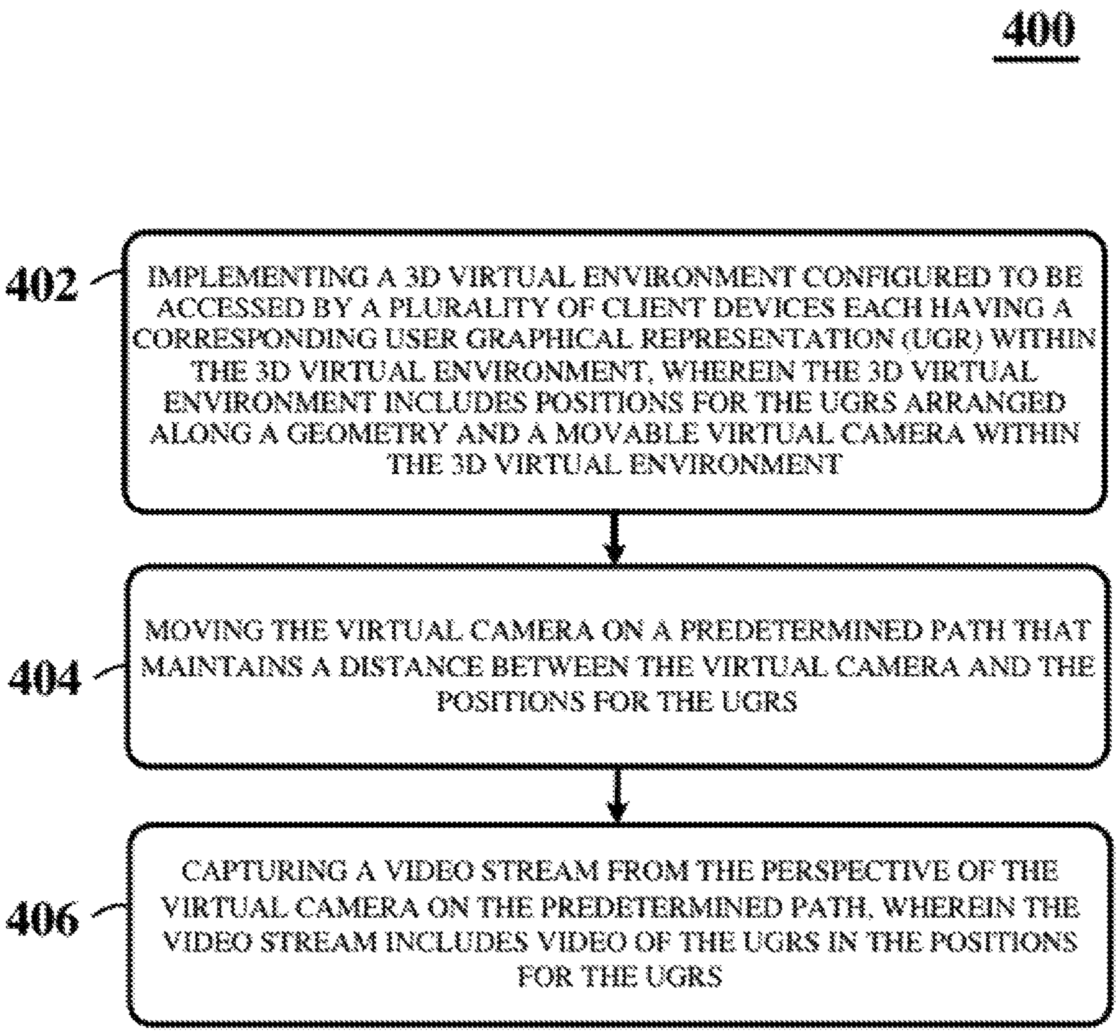
FIG. 4 is a flow chart of an illustrative method for implementing a movable virtual camera for improved meeting views in a 3D virtual environment.

FIG. 4 shows a block diagram of method 400, according to an embodiment.

The method 400 begins in step 402 by implementing, by a computer system, a 3D virtual environment configured to be accessed by a plurality of client devices each having corresponding a user graphical representation within the 3D virtual environment, wherein the 3D virtual environment includes positions for the user graphical representations arranged along a geometry and a movable virtual camera positioned within the 3D virtual environment. The method 400 continues in step 404 by moving the virtual camera on one or more predetermined paths that maintain a constant distance between the virtual camera and the positions arranged in the geometry for the user graphical representations. In further embodiments, the one or more predetermined paths maintain a constant viewing orientation angle, which can help to keep the vertical orientation correct and stable and to clean and improve the appearance along with reducing visual noise, increasing the stability of the user experience in the virtual environment, as described above. In step 406, the method 400 proceeds by capturing a video stream from the perspective of the virtual camera on the predetermined path, wherein the video stream includes video of the user graphical representations in the positions arranged in the geometry.

Computer-readable media having stored thereon instructions configured to cause one or more computers to perform any of the methods described herein are also described. As used herein, the term "computer readable medium" includes volatile and nonvolatile and removable and nonremovable media implemented in any method or technology capable of storing information, such as computer readable instructions, data structures, program modules, or other data. In general, functionality of computing devices described herein may be implemented in computing logic embodied in hardware or software instructions, which can be written in a programming language, such as C, C++, COBOL, JAVA™, PHP, Perl, Python, Ruby, HTML, CSS, JavaScript, VBScript, ASPX, Microsoft .NET™ languages such as C#, and/or the like. Computing logic may be compiled into executable programs or written in interpreted programming languages. Generally, functionality described herein can be implemented as logic modules that can be duplicated to provide greater processing capability, merged with other modules, or divided into sub modules. The computing logic can be stored in any type of computer readable medium (e.g., a non-transitory medium such as a memory or storage medium) or computer storage device and be stored on and executed by one or more general purpose or special purpose processors, thus creating a special purpose computing device configured to provide functionality described herein.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A method performed by a computer system, the method comprising:

implementing a 3D virtual environment configured to be accessed by a plurality of client devices each having corresponding a user graphical representation within the 3D virtual environment, wherein the 3D virtual environment includes positions for the user graphical representations arranged in a geometry and a virtual camera positioned within the 3D virtual environment;

moving the virtual camera on a predetermined path that maintains a distance between the virtual camera and the positions arranged in the geometry for the user graphical representations; and capturing a video stream from the perspective of the virtual camera on the predetermined path, wherein the video stream includes video of the user graphical representations in the positions arranged in the geometry.

2. The method of claim 1, wherein the location or orientation of the movable virtual camera is configured to be controlled by at least one of the client devices.

3. The method of claim 1, wherein the geometry comprises a circle, an oval, a polygon, a linear geometry, an arcuate geometry, or a curvilinear geometry.

4. The method of claim 1, wherein the geometry is a circle, and wherein the predetermined path is a circular path within the circle.

5. The method of claim 1, wherein the geometry is a circle, wherein the predetermined path is a fixed point within the circle, and wherein the moving of the movable virtual camera on the predetermined path comprises rotating the virtual camera about an axis corresponding to the fixed point.

6. The method of claim 1, wherein the at least one virtual environment comprises one or more additional movable virtual cameras configured to be moved on the predetermined path or on different paths.

7. The method of claim 1, wherein the predetermined path maintains a constant viewing orientation angle between the virtual camera and the positions arranged in the geometry for the user graphical representations.

8. The method of claim 1, wherein the positions arranged in the geometry comprise defined seating positions for the user graphical representations at a virtual conference.

9. A non-transitory computer readable medium having stored thereon instructions configured to cause at least one computer comprising a processor and memory to perform steps comprising:

implementing a 3D virtual environment configured to be accessed by a plurality of client devices each having corresponding a user graphical representation within the 3D virtual environment, wherein the 3D virtual environment includes positions for the user graphical representations arranged in a geometry and a virtual camera positioned within the 3D virtual environment;

moving the virtual camera on a predetermined path that maintains a distance between the virtual camera and the positions arranged in the geometry for the user graphical representations;

and capturing a video stream from the perspective of the virtual camera on the predetermined path, wherein the video stream includes video of the user graphical representations in the positions arranged in the geometry.

10. The non-transitory computer readable medium of claim 9, wherein the location or orientation of the movable virtual camera is configured to be controlled by at least one of the client devices.

11. The non-transitory computer readable medium of claim 9, wherein the geometry is a circle, and wherein the predetermined path is a circular path within the circle.

12. The non-transitory computer readable medium of claim 9, wherein the geometry is a circle, wherein the predetermined path is a fixed point within the circle, and wherein the moving of the movable virtual camera on the predetermined path comprises rotating the virtual camera about an axis corresponding to the fixed point.

13. The non-transitory computer readable medium of claim 9, wherein the at least one virtual environment comprises one or more additional movable virtual cameras configured to be moved on the predetermined path or on different paths.

14. The non-transitory computer readable medium of claim 9, wherein the path maintains a constant viewing orientation angle between the virtual camera and the positions arranged in the geometry for the user graphical representations.

15. The non-transitory computer readable medium of claim 9, wherein the positions arranged in the geometry comprise defined seating positions for the user graphical representations at a virtual conference.

16. A computer system comprising one or more computers having at least one processor and memory, wherein the computer system is programmed to perform steps comprising:

implementing a 3D virtual environment configured to be accessed by a plurality of client devices each having corresponding a user graphical representation within the 3D virtual environment, wherein the 3D virtual environment includes positions for the user graphical representations arranged in a geometry and a virtual camera positioned within the 3D virtual environment;

moving the virtual camera on a predetermined path that maintains a distance between the virtual camera and the positions arranged in the geometry for the user graphical representations;

and capturing a video stream from the perspective of the virtual camera on the predetermined path, wherein the video stream includes video of the user graphical representations in the positions arranged in the geometry.

17. The computer system of claim 16, wherein the geometry is a circle, and wherein the predetermined path is a circular path within the circle.

18. The computer system of claim 16, wherein the geometry is a circle, wherein the predetermined path is a fixed point within the circle, and wherein the moving of the movable virtual camera on the predetermined path comprises rotating the virtual camera about an axis corresponding to the fixed point.

19. The computer system of claim 16, wherein the at least one virtual environment comprises one or more additional movable virtual cameras configured to be moved on the predetermined path or on different paths.

20. The computer system of claim 16, wherein the path maintains a constant viewing orientation angle between the virtual camera and the positions arranged in the geometry for the user graphical representations.

* * * * *